United States Patent
Tjabringa et al.

(10) Patent No.: US 6,237,754 B1
(45) Date of Patent: May 29, 2001

(54) ENDLESS CONVEYOR FOR AGRICULTURAL MACHINES

(75) Inventors: Heiko Tjabringa, Siddeburen (NL); Sebastian Jäger, Hannover (DE)

(73) Assignee: ARTEMIS Kautschuk- und Kunststofftechnik GmbH & Cie (DE)

( * ) Notice: Subject to any disclaimer, the term of this patent is extended or adjusted under 35 U.S.C. 154(b) by 0 days.

(21) Appl. No.: 09/196,650

(22) Filed: Nov. 19, 1998

(30) Foreign Application Priority Data

Nov. 19, 1997 (DE) ............................................... 197 51 245
Jul. 1, 1998 (DE) ............................................... 198 29 386

(51) Int. Cl.⁷ .................................................... B65G 15/54
(52) U.S. Cl. ................ 198/848; 198/803.14; 198/867.11
(58) Field of Search ..................... 198/848, 698, 198/867.11, 803.14, 957

(56) References Cited

U.S. PATENT DOCUMENTS

| | | | | |
|---|---|---|---|---|
| 510,558 | * | 12/1893 | Sargent | 198/848 |
| 1,285,448 | * | 11/1918 | Spooner | 198/848 |
| 1,766,754 | * | 6/1930 | King | 198/848 |
| 1,975,668 | | 10/1934 | Rodin . | |
| 2,309,155 | | 1/1943 | Anderson et al. . | |
| 2,714,257 | * | 8/1955 | Reading | 198/803.14 |
| 2,880,848 | * | 4/1959 | Lundy et al. | 198/848 |
| 3,154,459 | * | 10/1964 | Cranston | 198/848 |
| 3,296,062 | * | 1/1967 | Truslow | 198/848 |
| 3,356,207 | * | 12/1967 | Hensel | 198/848 |
| 4,635,788 | * | 1/1987 | McDonald | 198/848 |
| 5,421,450 | * | 6/1995 | Kitagawa et al. | 198/957 |
| 5,671,839 | * | 9/1997 | Sanderson | 198/848 |
| 5,725,084 | * | 3/1998 | Jager | 198/848 |

FOREIGN PATENT DOCUMENTS

| | | | |
|---|---|---|---|
| 33 09 281 A1 | 9/1984 | (DE) . | |
| 92-4218884 | * 12/1993 | (DE) | 198/848 |
| 945 112 | 4/1947 | (FR) . | |
| 1 200 324 | 7/1970 | (GB) . | |

* cited by examiner

Primary Examiner—Douglas Hess

(57) ABSTRACT

An endless conveyor for conveying tuberous agricultural products has at least two parallel and spaced apart, pull-resistant, flexible belts, extending in the conveying direction of the conveyor. Spaced apart and parallel followers extend perpendicularly to the conveying direction. The followers are connected to the at least two belts. A web is provided that has portions extending between the followers for supporting the tuberous agricultural products. The web has flexible web elements extending angularly to one another and having crossing points. The web elements are connected fixedly to another at the crossing points.

23 Claims, 3 Drawing Sheets

ENDLESS CONVEYOR FOR AGRICULTURAL MACHINES

BACKGROUND OF THE INVENTION

The present invention relates to an endless conveyor for tuberous agricultural products, for example, potatoes, in connection with harvesting machines. The conveyor is comprised of two or more parallel, pull-resistant, flexible belts arranged in the conveying direction and spaced apart wherein followers extending parallel to one another and perpendicularly to the belts are connected to the belts. These followers are stiff and support between them a support structure for the products to be conveyed.

In known conveyors of this kind the support structure is provided by a continuous or endless plastic band on which the material to be conveyed rests.

It is an object of the present invention to provide for the conveyor of the aforementioned kind a weight reduction and to further achieve that foreign materials, for example, soil and rocks, can fall through the conveyor so that a certain degree of separation is already provided.

SUMMARY OF THE INVENTION

As a solution to this object it is inventively suggested to provide the support structure as a web whereby the cord-like web elements forming the web are connected at their crossing points by a shear-resistant connection (fixed connection) so that a sufficient support action of the web for potatoes, etc. is provided but, on the other hand, it is ensured that undesirable foreign materials or products of smaller size will fall through the web. It is understood that such a support structure is comparatively light-weight and thus results in a weight reduction of the conveyor.

In the area of projecting followers provided by the rods, the web is preferably doubled or looped and guided about the support body of the follower. Because of this doubling or looping, the web can be fastened by clamps at the follower or by other securing means penetrating the follower. It is also possible to secure the loop of the web, respectively, its sections to one another.

Between neighboring projecting followers, the web can be supported by further rods that do not project upwardly but extend perpendicularly to the lateral belts and are connected with their ends to these belts. However, it is also possible to only partially support the web between the followers, i.e., to suspend it partially, and in certain situations with elimination of any further support location over the entire spacing between the projecting followers. The web is then only connected to these followers.

It is expedient to provide mesh openings of the web having a mesh width of 1–5 cm, preferably 1–3 cm. Transversely extending stiff rods for supporting the web can be positioned at a spacing of approximately 8–12 cm. Accordingly, the width of the mesh opening is substantially smaller than the spacing between the rods.

BRIEF DESCRIPTION OF THE DRAWINGS

The object and advantages of the present invention will appear more clearly from the following specification in conjunction with the accompanying drawing, in which.

DESCRIPTION OF PREFERRED EMBODIMENTS

Figure 1:
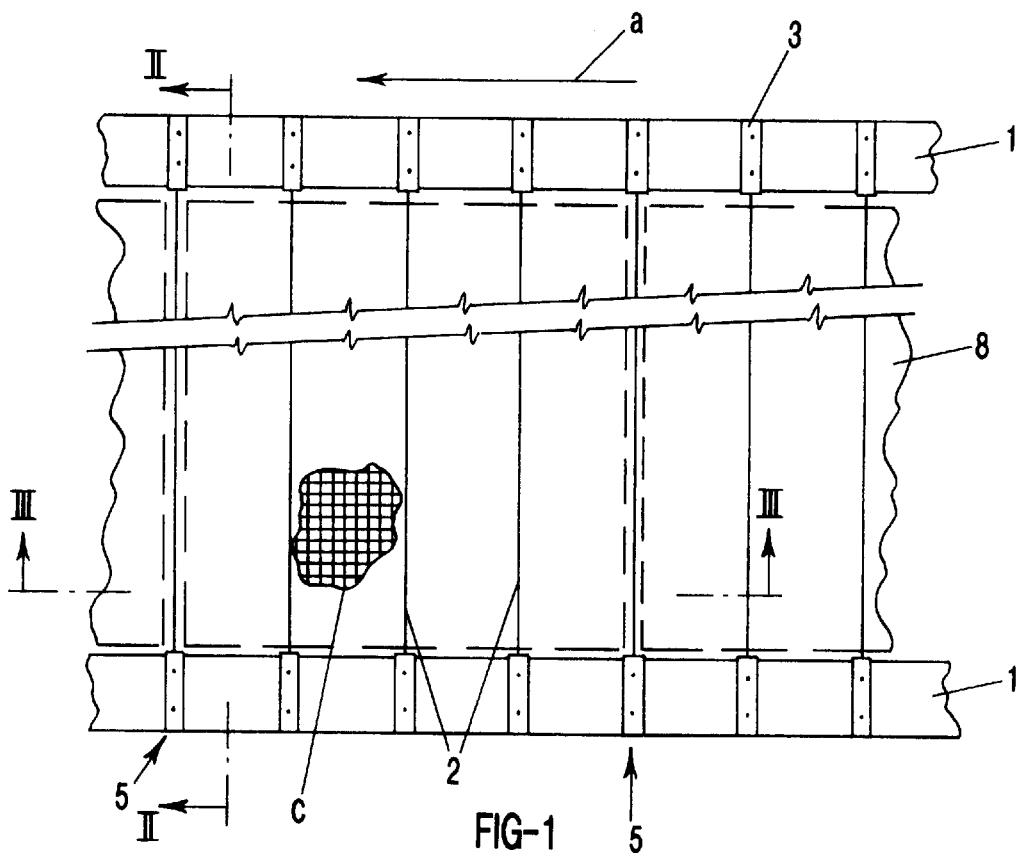
FIG. 1 is a partial top view of an endless conveyor belt for an incline conveyor of a potato harvesting machine.

On both lateral sides of the endless conveyor moving in the direction of arrow a belts 1 of endless design and having a flat, rectangular cross-section are provided. The belts 1 are pull-resistant and flexible and, in general, comprised of rubberized fabric. The belts 1 have rods 2 attached thereto. The rods 2 are positioned perpendicularly to the conveying direction a and are connected with their usually flat ends 3 on top of the belts 1 by rivets 4, etc. At a distance comprising multiple spacings between rods 2, projecting followers 5 extending in the upward direction are provided, which, in addition to a rod 2, also comprise an upper, fixedly anchored top beam 6 with legs 6a, 6b and at least one intermediate transverse beam 7 connected to the legs 6a, 6b. These reinforcement beams for the follower 5 may also comprise additional support beams which may increase the tilting safety of the follower 5 and which can be embodied as desired.

Figure 2:
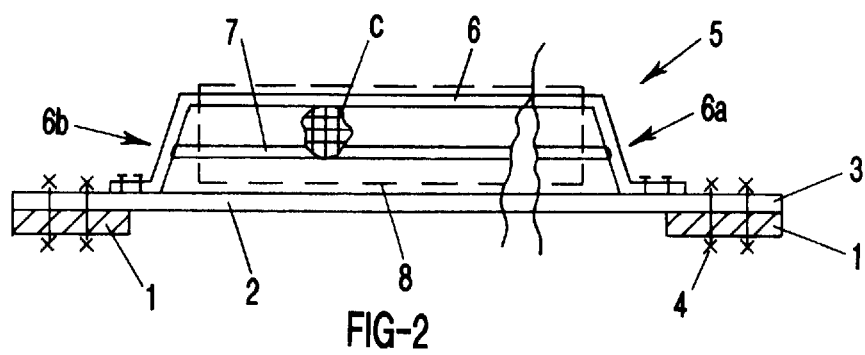
FIG. 2 is a section along the line II—II of FIG. 1.
Figure 3:
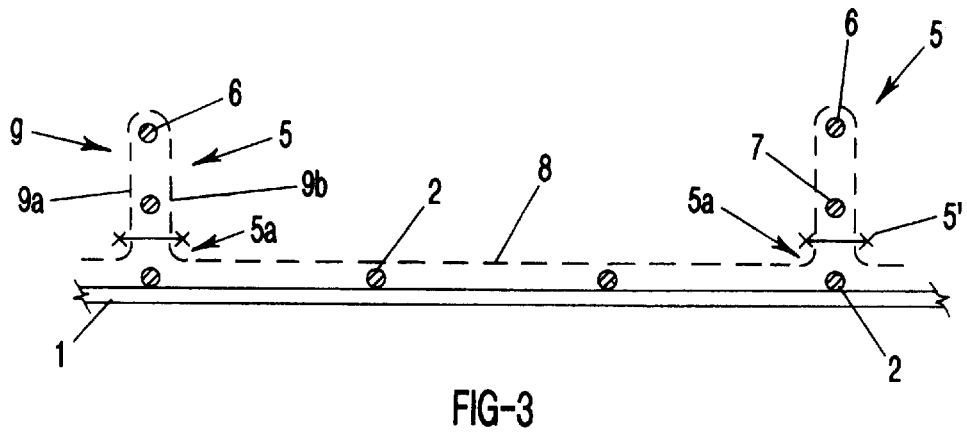
FIG. 3 is a part-sectional view along to the line III—III of FIG. 1.
Figure 4:
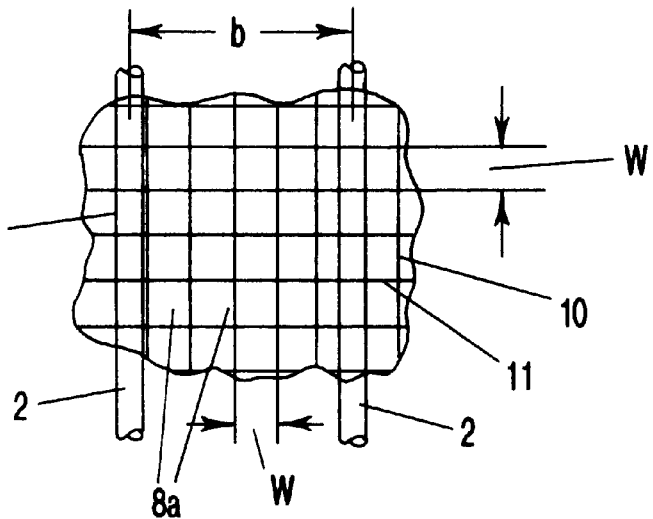
FIG. 4 is a partial top view, similar to the representation of FIG. 1, on enlarged scale.
Figure 5:
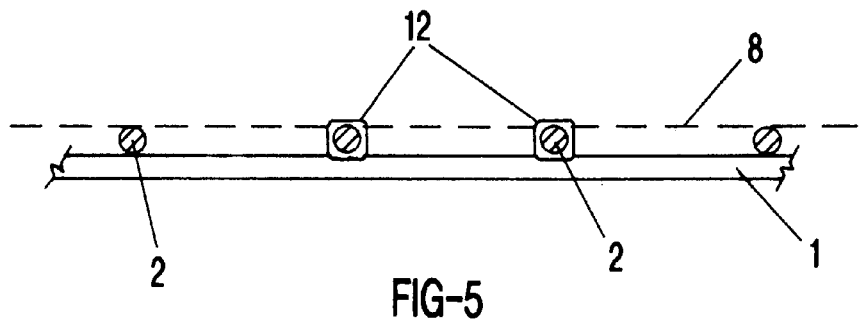
FIG. 5 is a partial-sectional view of another embodiment of the conveyor.
Figure 6:
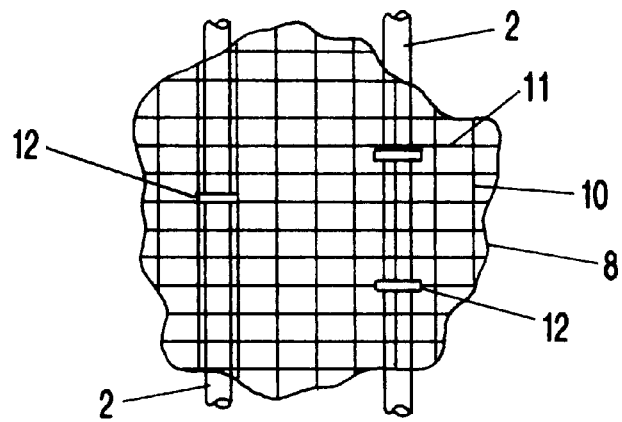
FIG. 6 is a partial top view of the conveyor according to FIG. 5.

The spacing b of the rods 2 relative to one another is preferably 80–120 mm. In order to be able to transport with such a large spacing b tuberous products, for example, potatoes, and in order to minimize the weight of the actual conveyor, the rods 2 are covered over the entire length of the conveyor by a web 8 which, in order to facilitate the drawing in FIGS. 1 and 2, is only partially represented and which is connected at suitable locations, for example, by clamping, cramping, hooks, etc. such with the conveyor belt that during operation it cannot move relative to the conveyor belt or come off. As can be seen furthermore from FIGS. 1–3, the web 8 covers the spacing between neighboring rods 2. Accordingly, the web 8 forms the active element of the conveyor that actually supports and transports the material to be conveyed.

In the area of the follower 5, the web 8 is guided or looped about the parallel beams 6, 7 and is connected in the foot area 5a of the follower 5 by a screw connection 5', etc. by connecting the sections 9a, 9b of the loop 9 positioned before and behind the elements 6, 7.

The web elements 10, 11 which form the web 8 are comprised of pull-resistant cords extending at a right angle to one another and connected in a shear-resistant manner to one another. They extend in a conveying direction a or perpendicularly thereto, whereby in embodiments of the conveyor for light duty the web elements 11, 10 can be at an angle of preferably less than 45° to the conveying direction a in order to thus provide a certain elasticity of the web 8. It is furthermore important for square mesh openings 8a of the web 8 that their mesh width w is multiple times smaller than the spacing b. Preferably, the mesh width w is approximately 1 to 3 cm.

The web elements 10, 11 are preferably embodied as textile elements in the form of cords or in the form of plastic coated metallic wires in order to protect the material to be harvested.

It should also be mentioned that the spacing between the followers 5 is approximately 30 to 60 cm and the height of the followers is approximately 60 to 180 mm.

As mentioned before, the invention with its web covering allows increased spacing of the rods 2 between the followers 5.

It should be noted that the web elements 10 of the web 8 can be embodied so as to be reinforced even to such an extent that the rods 2 can be completely replaced whereby, expediently, flexible web elements 10 are arranged between two such reinforced web elements 10 in order not to impede the elasticity of the web 8.

In the embodiment according to FIGS. 5 through 8 the follower is formed by the rods 2 themselves. This embodiment is suitable especially for conveyors having an upper conveying path extending in a horizontal plane or positioned only with a minimal incline, for example, in the context of sorting conveyors.

The web 8 designed for such conveyors is resting flat on the rods 2, i.e., covers the spacing between the rods. The attachment of the web 8 at the rods is achieved by loops 12 comprised of cords that surround the elements 10 and a rod 2. The rods 2 act as followers. This follower function is also provided by the web 8 which, under the effect of the material to be conveyed, can deform and thus provide a sorting of the goods to be conveyed.

Figure 7:
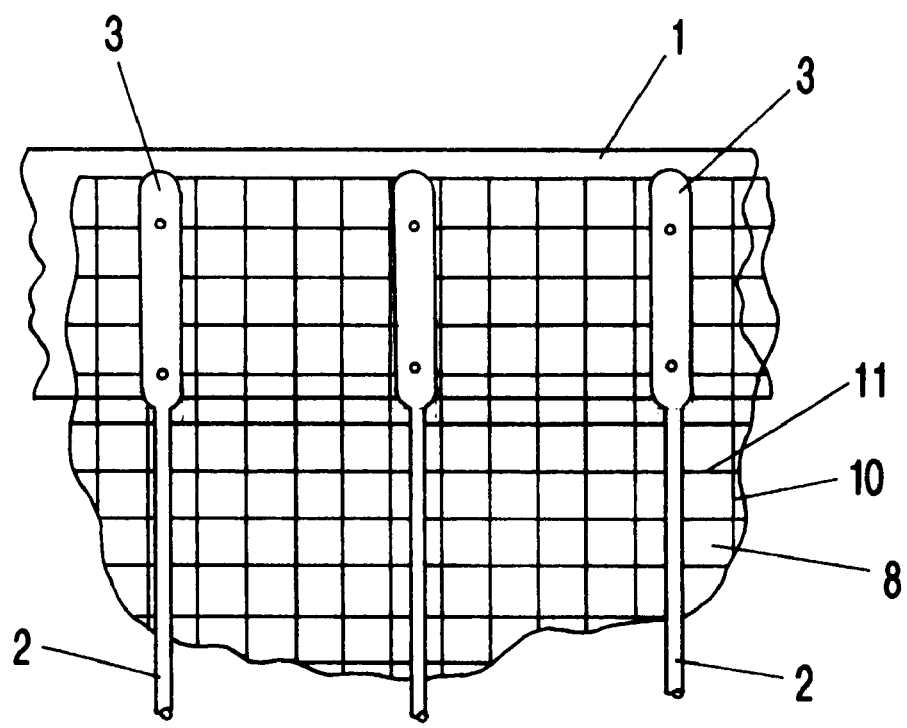
FIG. 7 is a partial top view of a further embodiment of the conveyor.
Figure 8:
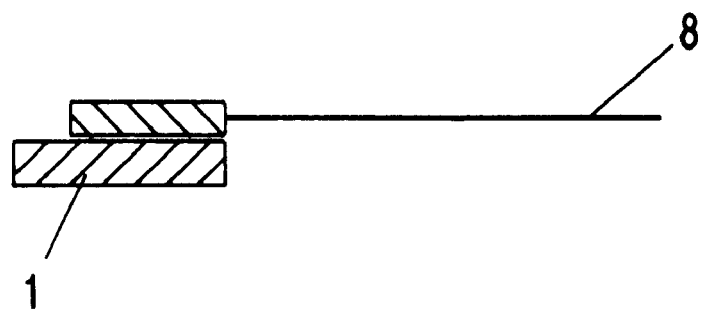
FIG. 8 is a part-sectional view of a further conveyor according to the present invention.

The lateral edge attachment of the web 8 can be provided as shown in FIG. 7. With its lateral edges the web 8 rests on the belts 1. It is clamped in the area of the rods 2 between the ends 3 and the corresponding belt 1. The web 8 can be additionally connected between the ends 3, for example, by cramping etc.

The invention may include edge reinforcement of the web 8 especially in the area of the belts 1. According to FIG. 8 doubling, facing, welting, stitching, etc. can be provided.

These measures reinforce, however, the web 8 only at its edges while between the edges the required softness and deformability are maintained. The bending softness in the center portion of the web 8 is thus not affected. These edge reinforcements can be designed such that the belts 1 are replaced by the reinforced belt edges or at least partially replaced thereby.

The inventive conveyor can also be used for other tuberous produce, for example, tomatoes, onions etc., respectively similarly shaped vegetables, i.e., for any type of produce to be harvested which must be conveyed in a protected fashion but must be sorted also.

It should be noted that, in contrast to the representation according to FIG. 7, the web 8 in the area between the lateral edges 1 can rest on the parallel rods 2. In this embodiment, the rods 2 must be guided through the web 8 because they are arranged alternatingly above and below the web 8 in order to thus increase the supporting action of the web.

Between the two laterally arranged belts 1, and optionally also on the belts 1, the rods 2 can be placed in the manner of a woven fabric with warp and welt alternatingly above and below the web 8 whereby the elements 11 are positioned partly above partly and below the rods 2. This results in an excellent connection between the web 8 and the rods 2.

The specification incorporates by reference the disclosure of German priority documents 198 29 386.0 of Jul. 1, 1998 and 197 51 245.3 of Nov. 19, 1997.

The present invention is, of course, in no way restricted to the specific disclosure of the specification and drawings, but also encompasses any modifications within the scope of the appended claims.

What is claimed is:

1. An endless conveyor for conveying tuberous agricultural products, said conveyor comprising:
   at least two parallel and spaced apart, pull-resistant, flexible belts (1) extending in a conveying direction (a) of said conveyor;
   spaced apart and parallel followers (5) extending perpendicularly to said conveying direction (a);
   said followers (5) connected to said at least two belts (1);
   at least two parallel rods (2) perpendicularly connected to said at least two belts (1);
   a web (8) having portions extending between said followers (5) for supporting the tuberous agricultural products, said portions supported by said at least two parallel rods (2), said web (8) guided in a loop about said followers (5) and secured thereto;
   said web (8) comprised of flexible web elements (10, 11) extending angularly to one another and having crossing points;
   said web elements (10, 11) connected fixedly to one another at said crossing points.

2. A conveyor according to claim 1, wherein first ones of said web elements (11) extend perpendicularly to said parallel rods (2), and wherein said first web elements (11) are alternatingly arranged above and below said parallel rod (2).

3. A conveyor according to claim 1, wherein said loop (9) has two sections (9a, 9b) and wherein said two sections (9a, 9b) are connected to one another.

4. A conveyor according to claim 3, wherein said followers (5) have a foot portion (5a) and wherein said two sections (9a, 9b) are connected by a screw connection (5') at said foot portion (5a).

5. A conveyor according to claim 1, wherein said at least two parallel rods (2) are spaced at a spacing (b) of 8 to 12 cm from one another for supporting said web (8), wherein said web (8) has square mesh openings (8a) and said mesh openings (8a) have a mesh width (w), wherein said spacing (b) between said parallel rods (2) is a multiple of said mesh width (w).

6. A conveyor according to claim 5, wherein said mesh width is 1 cm to 5 cm.

7. A conveyor according to claim 5, wherein said mesh width is 2 cm to 3 cm.

8. A conveyor according to claim 1, wherein first ones of said web elements (11) extend in said conveying direction (a) and wherein second ones of said web elements (10) extend perpendicularly to said first web elements (10).

9. A conveyor according to claim 1, wherein first ones of said web elements (11) extend at an angle of 45° to said conveying direction (a) and wherein second ones of said web elements (10) extend perpendicularly to said first web elements (10).

10. A conveyor according to claim 1, wherein said web elements (10, 11) of said web (8) are textile cords.

11. A conveyor according to claim 1, wherein said web elements (10, 11) of said web (8) are plastic-coated metal wires or plastic-coated metal cables.

12. A conveyor according to claim 1, wherein first ones of said web elements (10) extend above said parallel rods (2).

13. A conveyor according to claim 1, wherein said portions of said web (8) are at least partially freely suspended.

14. A conveyor according to claim 1, wherein said web (8) is connected only to said followers (5) and said portions are freely suspended between said followers (5).

15. A conveyor according to claim 1, wherein said web (8) is connected only to said followers (5) and said portions between said followers rest on said parallel rods (2).

16. A conveyor according to claim 1, wherein said followers (5) are said parallel, spaced apart rods (2) perpendicularly connected to said at least two belts (1), wherein a spacing between said parallel rods (2) is multiple times greater than a mesh width (w) of mesh openings (8a) of said web (8).

17. A conveyor according to claim 16, further comprising loop connectors (12) connecting said web (8) to said parallel rods (2).

18. A conveyor according to claim 1, wherein first ones of said web elements (10) extend perpendicularly to said conveying direction (a) and are reinforced to provide a supporting action for said web (8) between said followers (5).

19. A conveyor according to claim 1, wherein said web (8) has edges in said conveying direction and said edges are reinforced by doubling, stitching, welting or facing.

20. A conveyor according to claim 1, wherein said web (8) has edges clamped between said parallel rods (2) and said at least two belts (1).

21. A conveyor according to claim 1, wherein said web (8) has edges in said conveying direction (a) and wherein said edges are connected to said at least two belts (1) by cramping.

22. A conveyor according to claim 1, wherein said web (8) has edges in said conveying direction and said edges are reinforced such that said edges replace at least partially said belts (1).

23. An endless conveyor for conveying tuberous agricultural products, said conveyor comprising:

at least two parallel and spaced apart, pull-resistant, flexible belts (1) extending in a conveying direction (a) of said conveyor;

spaced apart parallel followers (5) extending perpendicularly to said conveying direction (a), said followers (5) connected to said at least two belts (1), said followers comprising lateral legs (6a, 6b), a top beam (6) connected to said lateral legs (6a, 6b), and at least one transverse beam (7) connected to said lateral legs (6a, 6b) and extending parallel to said top beam (6) between said top beam (6) and a conveying plane of said conveyor;

a web (8) having portions extending between said followers (5) for supporting the tuberous agricultural products;

said web (8) comprised of flexible web elements (10, 11) extending angularly to one another and having crossing points;

said web elements (10, 11) connected fixedly to one another at said crossing points.

* * * * *